US011528918B2

(12) United States Patent
Dean (10) Patent No.: US 11,528,918 B2
(45) Date of Patent: Dec. 20, 2022

(54) SMOKE TUBE COMBUSTION CHAMBER (71) Applicant: Dansons US, LLC, Phoenix, AZ (US)

(72) Inventor: Jay Dean, Tempe, AZ (US)

(73) Assignee: Dansons US, LLC, Scottsdale, AZ (US)

(*) Notice: Subject to any disclaimer, the term of this patent is extended or adjusted under 35 U.S.C. 154(b) by 63 days.

(21) Appl. No.: 17/088,032

(22) Filed: Nov. 3, 2020

(65) Prior Publication Data
US 2022/0132874 A1 May 5, 2022

(51) Int. Cl.
*A23B 4/052* (2006.01)

(52) U.S. Cl.
CPC .......... *A23B 4/052* (2013.01); *A23V 2002/00* (2013.01)

(58) Field of Classification Search
CPC ............... A23B 4/052; A23V 2002/00; B60H 1/00685; A47J 37/0704; A47J 37/0664; A47J 37/049; A47J 37/0623; A47J 37/0731; A47J 37/0786; A47J 37/07; F23B 40/08; F24B 13/04; F24B 1/199; F24B 1/024; F24B 15/00
See application file for complete search history.

(56) References Cited

U.S. PATENT DOCUMENTS

| 5,865,099 | A | 2/1999 | Waugh | |
|---|---|---|---|---|
| 6,810,792 | B1* | 11/2004 | Knight | A47J 37/0704 99/450 |
| 7,426,885 | B2* | 9/2008 | McLemore | A23B 4/052 126/59.5 |
| 8,020,547 | B2* | 9/2011 | Hepper | F24B 1/10 126/73 |
| 9,883,962 | B2* | 2/2018 | Yamashita | A61M 25/0097 |
| 10,710,428 | B2* | 7/2020 | Klinkhammer | B60H 1/00685 |
| 2006/0137543 | A1 | 6/2006 | McLemore et al. | |
| 2010/0251973 | A1* | 10/2010 | Dongo | F24H 9/2057 110/108 |
| 2012/0012096 | A1* | 1/2012 | Cusack | A47J 37/0786 432/3 |
| 2018/0098661 | A1* | 4/2018 | Dodds | A47J 37/0786 |
| 2019/0162403 | A1* | 5/2019 | Dimitrov | F23L 9/02 |
| 2019/0303848 | A1* | 10/2019 | Schoening | G06Q 10/0833 |
| 2020/0196798 | A1 | 6/2020 | Boltz et al. | |
| 2020/0214304 | A1* | 7/2020 | Garces | A23B 4/052 |

OTHER PUBLICATIONS

European Search Report for Application No. 21205629.5, dated Jul. 25, 2022, 10 pages.
European Search Report for Application No. 21205629.5, dated Apr. 20, 2022, 12 pages.

* cited by examiner

*Primary Examiner* — Jimmy Chou
*Assistant Examiner* — Yi Hao
(74) *Attorney, Agent, or Firm* — Seyfarth Shaw LLP (57) ABSTRACT

Disclosed is a smoke tube combustion chamber that combusts fuel such as wood pellets to provide heat and smoke flavor to the food being cooked. The smoke tube may include two portions that rotate about one another to receive fuel, dispose of excess fuel or fuel waste, and combust the fuel, depending on the positions of the two portions. A flow path may communicate with the smoke tube to provide the necessary air flow to circulate the smoke and heat created by the smoke tube during use. The smoke tube may be a primary or secondary heat source within the appliance.

7 Claims, 7 Drawing Sheets

SMOKE TUBE COMBUSTION CHAMBER

TECHNICAL FIELD OF THE INVENTION

The presently disclosed embodiments relate generally to grills and smokers. More particularly, the presently disclosed embodiments relate to a tube within a grill or smoker where fuel can be combusted to provide heat and flavor to the food being cooked.

BACKGROUND OF THE INVENTION

Smokers are a common outdoor cooking appliance that burn fuel at a low temperature to cause smoke to flow into a cook chamber. The smoke not only cooks the meat within the cook chamber but also provides flavor during the cooking process. Grills can use a similar process to burn fuel, typically at higher temperatures, to likewise provide a flavor to the food that is difficult to obtain using a conventional indoor cooking appliance.

Pellet grills and smokers are common types of appliances used for cooking meat or other food. These appliances burn pellets of wood based on a temperature of the cook chamber. A user can operate a controller to set the temperature of the cook chamber and the appliance will then burn pellets until the temperature is reached. Thereafter, the appliance will sense that the desired temperature has been reached and will temporarily halt the supply of pellets to avoid going above the desired temperature, similar to a thermostat system.

Pellet grills and smokers typically include a burn pot assembly that combusts the pellets to provide the necessary heat and smoke to the food in the pellet grill. Users typically favor a pellet grill that provides a large amount of smoke so that the food may exhibit a "smoke ring" and so that the flavor of the pellets penetrates the food.

SUMMARY OF THE INVENTION

The presently disclosed embodiments include a smoke tube combustion chamber that combusts fuel such as wood pellets to provide heat and smoke flavor to the food being cooked. The smoke tube may include inner and outer tubes that rotate about one another to adjust from a receiving position where pellets may enter the smoke tube, a clearing position where pellets or pellet waste (e.g., ash) may be disposed from the smoke tube, and a heating position where the smoke tube is closed and the pellets are combusted. A novel flow path may be provided in operative communication with the smoke tube to provide the necessary air flow to circulate the smoke and heat created by the smoke tube during use. The smoke tube may be a primary or secondary heat source within the appliance.

In particular, the presently disclosed embodiments include a smoker including a smoke tube having first and second portions where at least the first portion is movable with respect to the second portion. The smoker further includes first and second openings respectively defined within the first and second portions. The first and second openings are aligned in a receiving position to collectively define a receiving opening that faces gravitationally upward to receive fuel. The first and second openings are offset in a heating position to enclose the fuel. The first and second openings collectively defining a releasing opening in a releasing position to release contents of the smoke tube. A heating element is associated with the smoke tube and selectively heats the smoke tube.

The presently disclosed embodiments also include a smoker having a combustion chamber, and a flow path communicating with the combustion chamber. The flow path includes an inlet for receiving air, an outlet for dispensing air from the flow path, and an acceleration portion disposed between the inlet and outlet proximate an area where the flow path communicates with the combustion chamber. The acceleration pathway has an acceleration inlet and outlet. An inlet cross-sectional area of the acceleration inlet is greater than an outlet cross-sectional area of the acceleration outlet.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The presently disclosed embodiments include a smoke tube combustion chamber that combusts fuel with a greater surface area than a conventional burn pot. The smoke tube heats fuel such as wood pellets to provide heat and smoke flavor to the food being cooked. The tube may include an inner tube that rotates about an outer tube, with each of the inner and outer tubes including an opening. The openings, when aligned, allow the entry or exit of pellets or ash such that the smoke tube may operate in three separate positions: a receiving position where pellets may enter the smoke tube, a clearing position where pellets or ash may be disposed from the smoke tube, and a heating position where the smoke tube is closed and the pellets are combusted. To facilitate the circulation of air and smoke, a flow path may be provided that communicates with the smoke tube to help carry the smoke to the cooking chamber and better circulate the smoke and heat created by the smoke tube during use. The smoke tube may be a primary or secondary heat source within the appliance.

As shown in FIGS. 1-7, an appliance 100 such as a grill or smoker includes a burn pot 105 for burning fuel, and a smoker 107 that provides smoke and heat separate and apart from the burn pot 105. In certain embodiments, the burn pot 105 can be omitted and the smoker 107 can be the primary source of heat and smoke. In other embodiments, the smoker 107 is a secondary heat and smoke source that provides additional smoke to increase the quality of the food being cooked, such as by improving the penetration of the smoke and providing a deeper "smoke ring" on the food being cooked.

A flow path 110 can be provided that improves the circulation of the heat and smoke generated by the smoker 107. The flow path 110 can communicate with a smoke tube 115 where fuel such as pellets or other fuel can be combusted by internal or external heating elements. The flow path 110 can include an inlet 117 that receives forced air from a blower to provide air flow into the flow path 110 and further improve the combustion of the fuel within the smoke tube 115 and the circulation of the heat and smoke produced by the smoke tube 115. The smoke and heat can exit the flow path 110 at an outlet manifold 120 that directs the smoke and heat in an upward direction toward the food and at a velocity greater than if the fuel were combusted using conventional means.

A heat distribution plate 125 can be provided to direct the heat produced by the burn pot 105 and to shield certain components from the heat of the burn pot 105. The components of the appliance 100 can also be directly or indirectly coupled to a frame 130 that acts as the structural backbone of the appliance 100. At the bottom of the frame 130 proximate the ground plane, the appliance 100 can include wheels 135 for better mobility of the appliance 100 and legs 140 to better anchor the appliance to the ground when positioned according to the preferences of the user.

Figure 1:
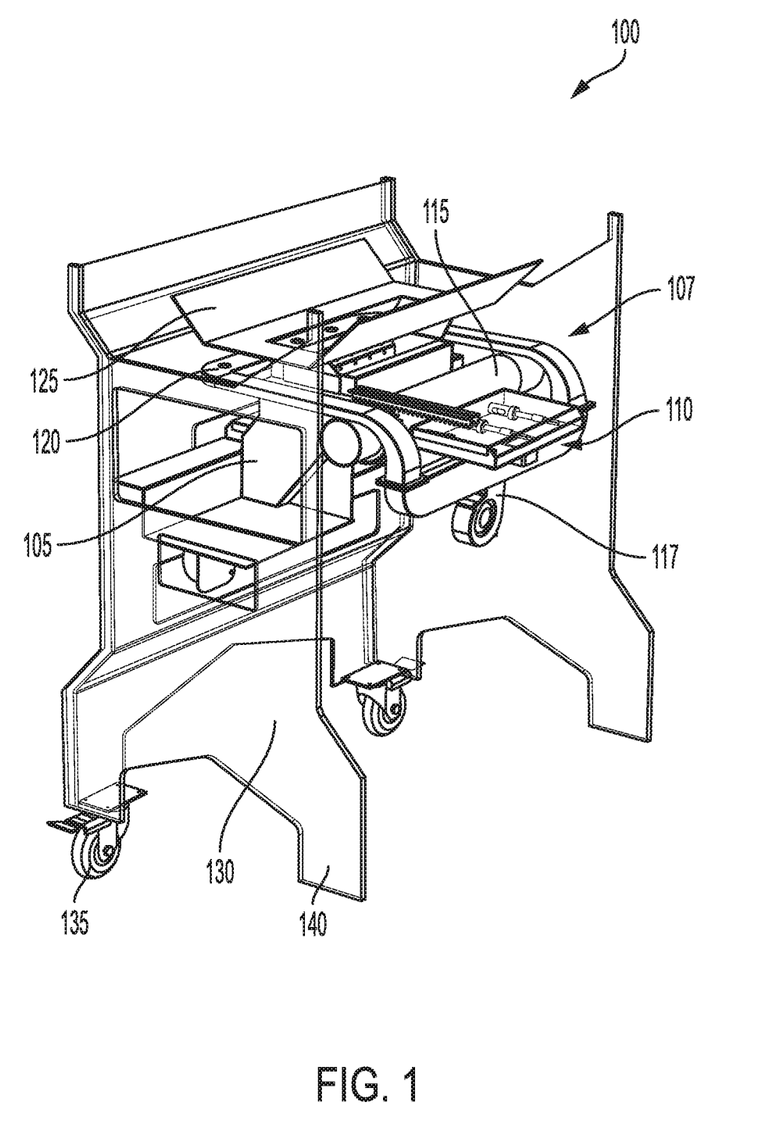
FIG. 1 is a rear perspective view of an appliance according to at least some of the presently disclosed embodiments.
Figure 2:
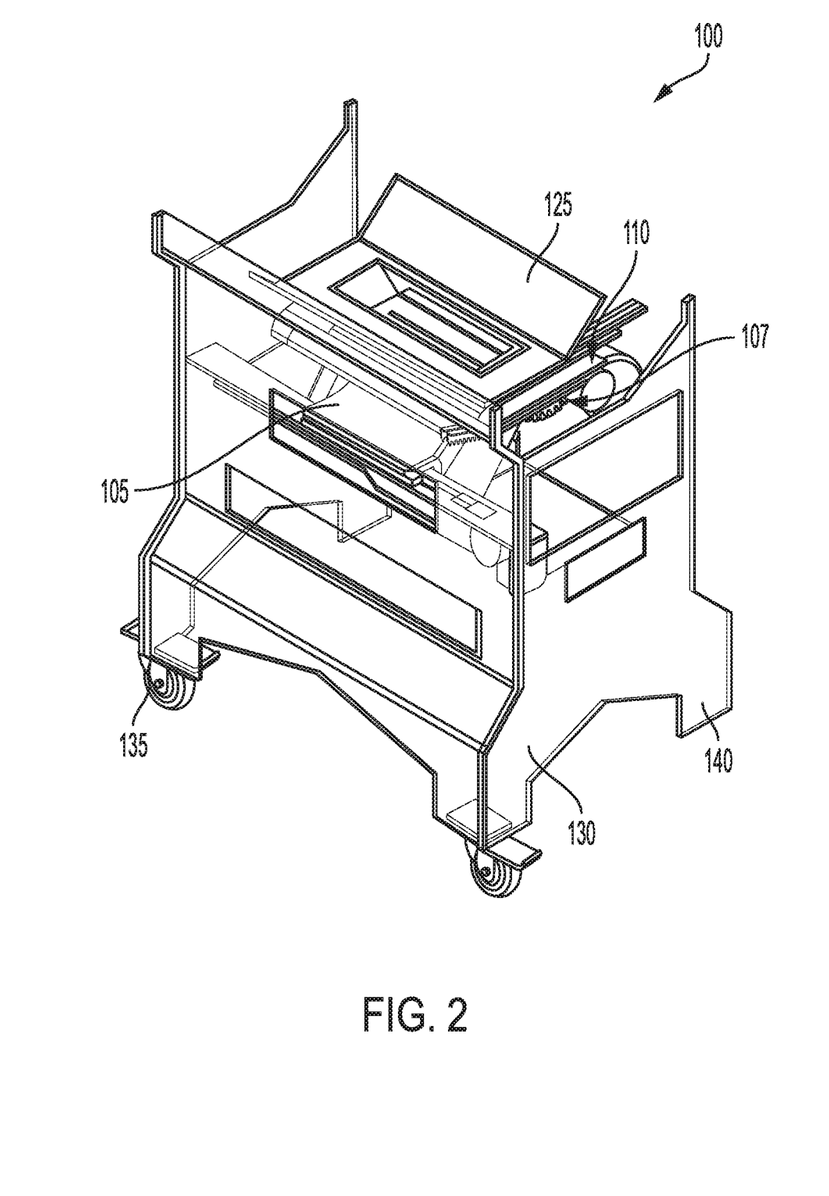
FIG. 2 is a top perspective view of the appliance according to at least some of the presently disclosed embodiments.
Figure 3:
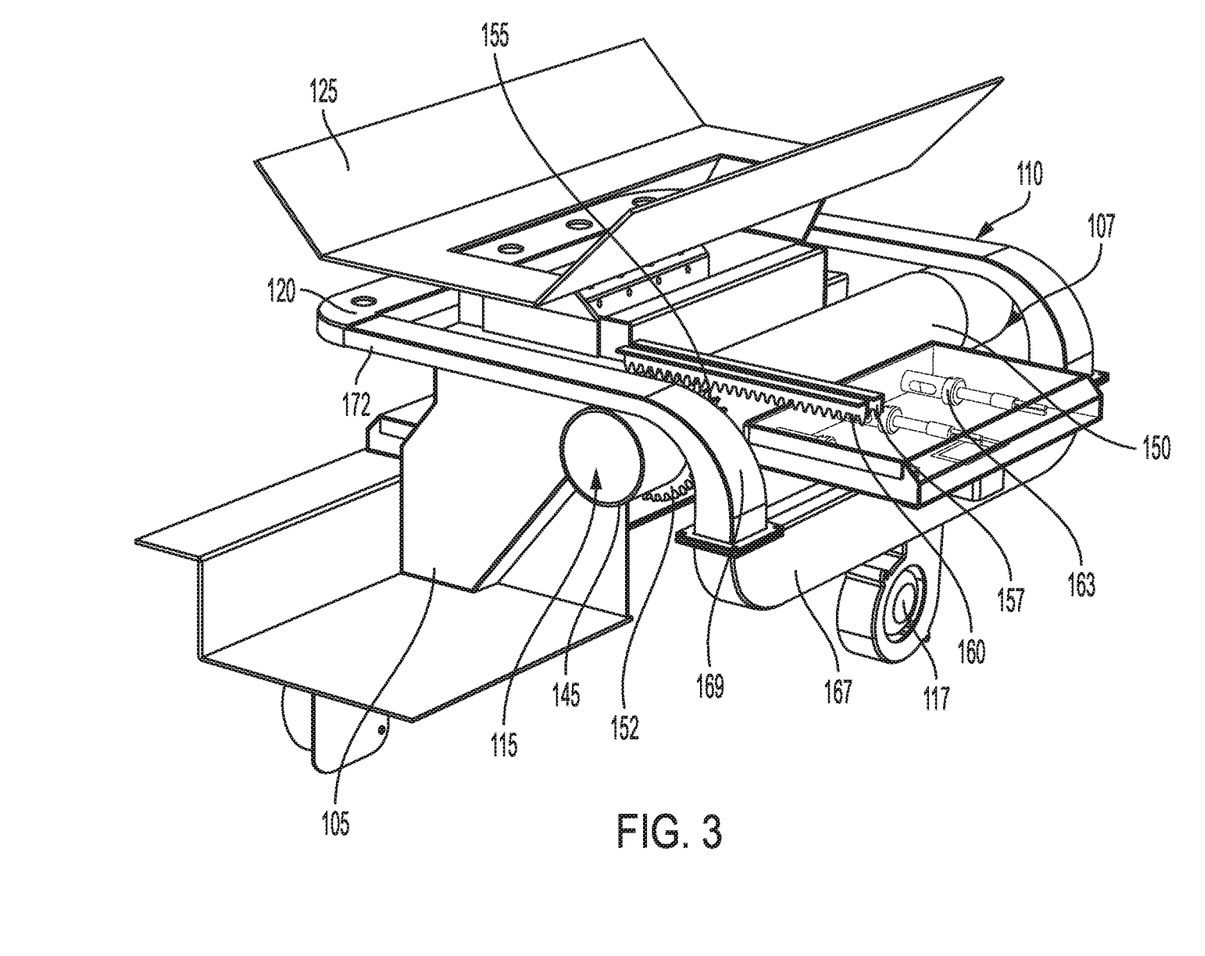
FIG. 3 is a rear perspective view of a portion of the appliance according to at least some of the presently disclosed embodiments.

FIG. 3 is a rear perspective view of a portion of the appliance 100 according to at least some of the presently disclosed embodiments. As shown in FIG. 3, the smoke tube 115 can include an inner tube 145 that rotates about an outer tube 150. The inner tube 145 can include an inner gear 152 and the outer tube 150 can include an outer gear 155. The gears 152, 155 can be manipulated by inner 157 and outer 160 actuator rods, respectively. For example, a controller can cause the inner 157 actuator rod to move transversely across the inner gear 152 to open or close the smoke tube 115, as discussed below in more detail.

The appliance 100 can include a heating element 163 to provide heat to the smoker 107 through electronic means. For example, the heating element 163 may be a ceramic heating element that is heated by an electric current controlled by a controller and powered by a battery or electrical outlet connected to the appliance 100 by a cord. Alternatively, or in addition to the above, the heating element 163 may be a metallic heating element that heats by passing a current through it. The heating element may also be gas powered where a flame heats the smoke tube 115, or an induction heater where a magnetic field causes coils to heat the smoke tube 115. The heating element 163 can be any other heat source without departing from the spirit and scope of the present invention.

As shown, the heating element 163 can be located external to the smoke tube 115 and can heat the smoke tube 115 from the outside, although the present invention is not so limited and the heating element 163 can be located within the smoke tube 115 in certain embodiments. The smoke tube 115 itself can be heated by induction furnace or electrical means, such as by providing a magnetic field in a manner that causes the smoke tube 115 itself to heat, or by passing current directly to the smoke tube 115. The smoke tube 115 can, in some embodiments, provide a greater surface area for combusting pellets and causing smoke to flow into the appliance 100 as compared to conventional pellet combustion devices such as a conventional burn pot, by providing a circular drum-type arrangement for the heating of the fuel.

The flow path 110 can include a blower input as the inlet 117 in some embodiments to allow a greater air flow through the flow path 110. In this case, the inlet 117 can be sized to receive and engage the outlet end of a blower, for example, a 12 volt direct current variable speed blower with 41 cubic feet of air per minute. The blower can provide so-called "dry air" containing approximately 78.09% nitrogen, 20.95% oxygen, 0.93% argon, 0.04% carbon dioxide, and small amounts of other gases, which facilitate the fuel combustion process and assist in the overall cooking process. Alternatively, no blower is required and the natural flow of air through the flow path 110 can be used to circulate the smoke and heat created within the smoke tube 115.

Figure 4:
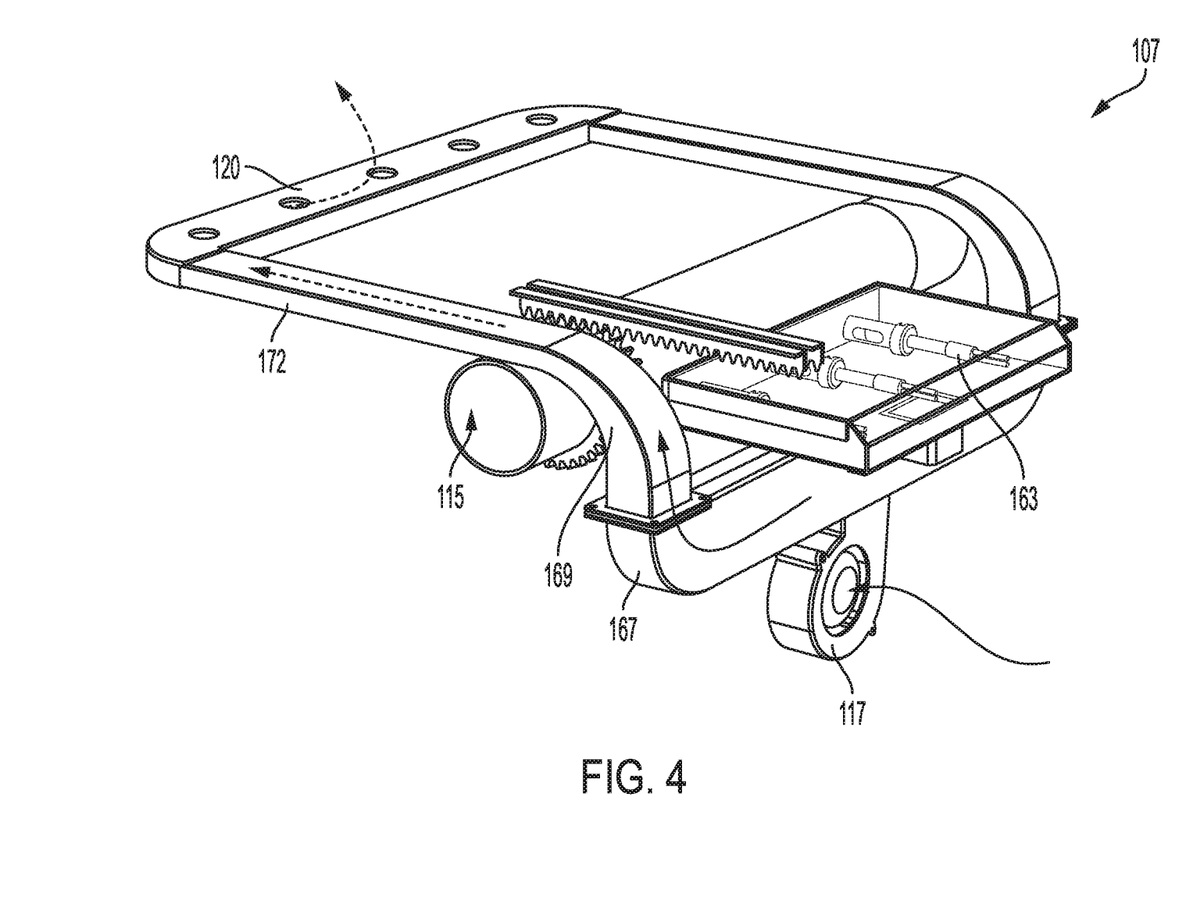
FIG. 4 is a rear perspective view of a smoker according to at least some of the presently disclosed embodiments.

As shown in FIGS. 3 and 4, the flow path 110 generally includes a lower pathway 167 that is communicably coupled to the inlet 117. The lower pathway 167 can be communicably coupled to an acceleration pathway 169 that in turn can be communicably coupled to a side pathway 172. Either the acceleration pathway 169, side pathway 172, or other portion of the flow path 110 proximate the acceleration pathway 169 can be communicably coupled to the smoke tube 115 to facilitate the circulation of smoke and heat from the smoke tube 115 to the remainder of the appliance 100. For example, the lower pathway 167 can lead to an acceleration pathway 169 that includes an inlet cross-sectional area that is larger than an outlet cross-sectional area of the acceleration pathway 169. This arrangement provides a venturi or Bernoulli effect and causes the air flowing through the acceleration pathway 169 to have a larger velocity and lower pressure at the outlet of the acceleration pathway 169 proximate the smoke tube 115. This in turn causes the smoke generated in the smoke tube 115 to flow towards the lower pressure, higher velocity air passing through the smoke tube 115 proximate the acceleration pathway 169 and towards the outlet manifold 120. In some embodiments, the lower pathway 167 can be located at a lower gravitational position as compared to the communication area between the smoke tube 115 and the flow path 110 to take advantage of the additional pressure differential created by the higher temperature air flowing through the acceleration pathway 169.

Figure 5:
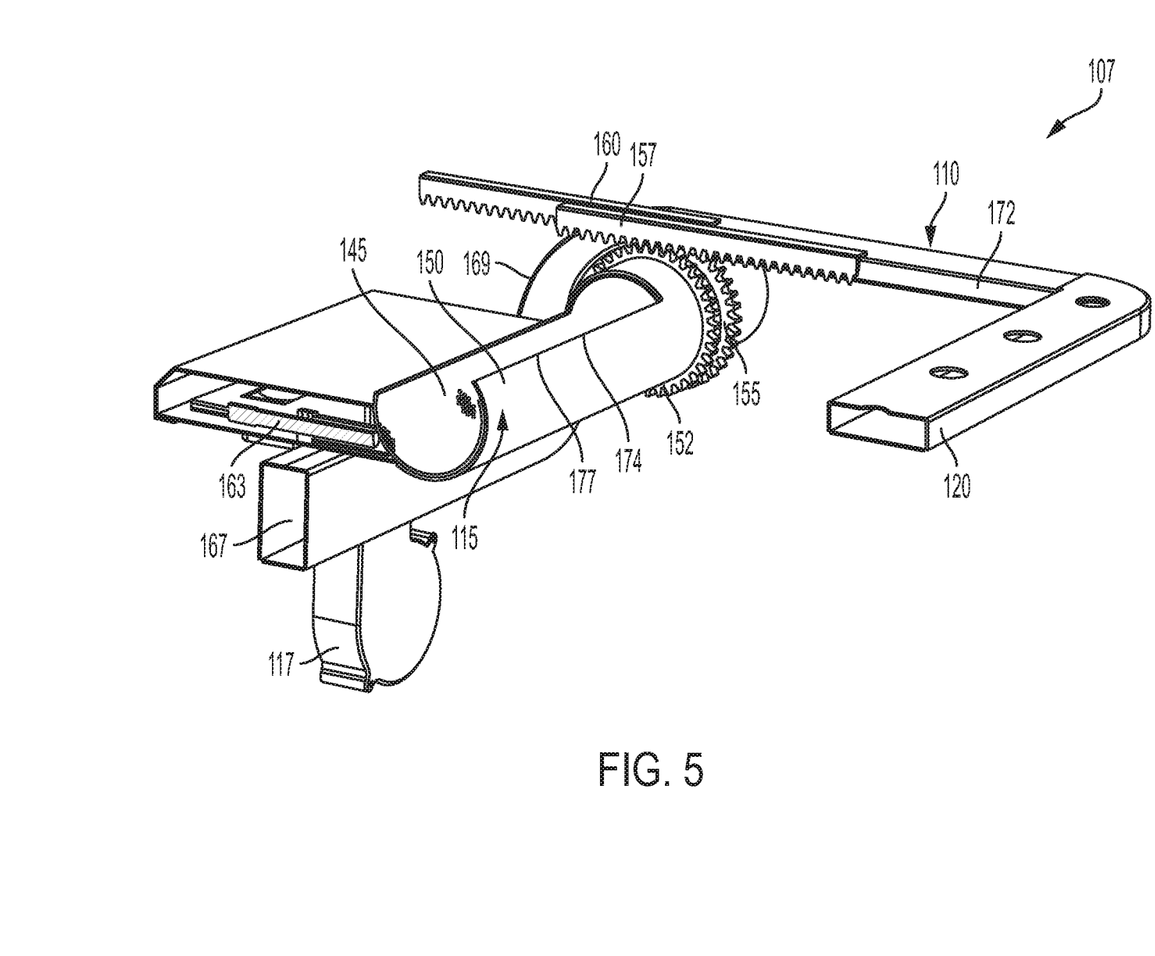
FIG. 5 is a partial broken front perspective view of the smoker in the receiving position according to at least some of the presently disclosed embodiments.
Figure 6:
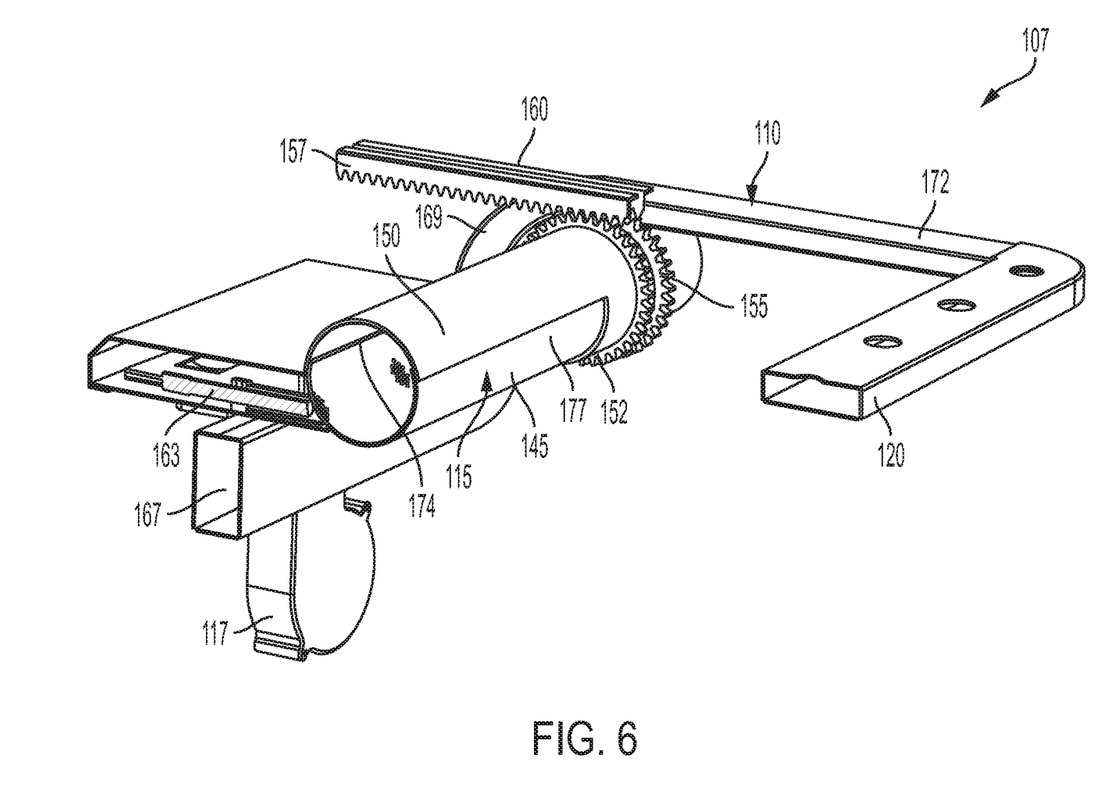
FIG. 6 is a partial broken front perspective view of the smoker in the heating position according to at least some of the presently disclosed embodiments.
Figure 7:
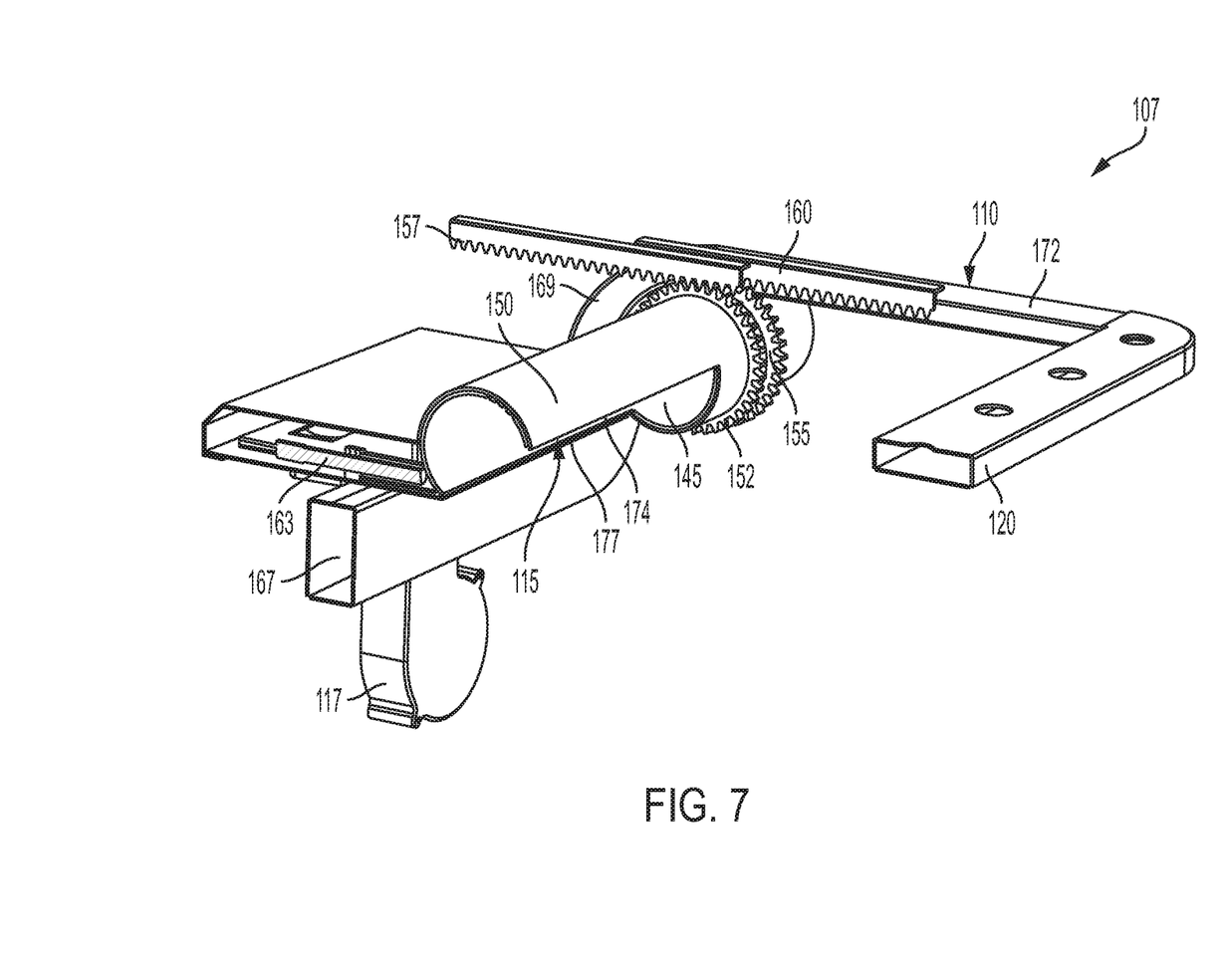
FIG. 7 is a partial broken front perspective view of the smoker in the clearing position according to at least some of the presently disclosed embodiments.

FIGS. 5-7 are partial broken front perspective views of the smoker 107 in the receiving position, heating position, and clearing position, respectively, according to at least some of the presently disclosed embodiments. As shown in FIGS. 5-7, the smoke tube 115 can include the inner tube 145 and outer tube 150 that rotate about one another depending on whether the smoke tube 115 is operating in the receiving position where the smoke tube 115 receives fuel such as pellets, the heating position where the smoke tube 115 houses the fuel while it is being heated and combusted, or the clearing position where the smoke tube 115 disposes of ash or excess fuel after the heating process is complete. As shown, the inner tube 145 can include an inner opening 174, and the outer tube 150 can include an outer opening 177.

A controller can control the inner 157 and outer 160 actuator rods to manipulate the inner 152 and outer 155 gears to thereby align the inner 174 and outer 177 openings or to offset the openings 174, 177 in the heating position. As shown in FIG. 5, the openings 174, 177 can be aligned in an upward gravitational direction when in the receiving position to receive pellets or other fuel provided by a hopper or other device. As shown in FIG. 6, the openings 174, 177 can be offset in the heating position to enclose the fuel within the smoke tube 115 and combust the fuel with heat provided by the heating element 163 or other heating means. As shown in FIG. 7, the openings 174, 177 can be aligned in a lower gravitational direction when in the clearing position to dispose of excess fuel or ash once the heating process has been completed or for any other reason. The smoke tube 115 can therefore operate to receive fuel, combust the fuel, and dispose of the fuel, based on automated or user-controlled operation to provide primary or secondary heat and smoke to the appliance.

As discussed above, the inner 145 and outer 150 tubes can be circular in cross-section, but the present invention is not so limited. The inner 145 and outer 150 tubes can be any shape that allows the smoke tube 115 to operate in a receiving position, heating position, and/or clearing position.

As is known in the art, the functioning of the various components of the presently disclosed embodiments can be operated by a controller. The controller can include an interface located on the controller or can be controlled remotely, for example through WiFi or Bluetooth means, to electronically control the temperature of the appliance 100, whether the smoke tube 115 is in the receiving position, heating position, or clearing position, the speed of the blower if a blower is used, or any other electronically controllable factor of the appliance 100. The appliance 100 can also be powered by a standard outlet connected to the appliance 100 by a cord, or by battery means, as is well known in the art.

As used herein, the terms "grill" or "smoker" are intended to be construed broadly as including any outdoor cooking appliance that uses heat. For example, a "grill" or "smoker" according to the present invention can include a grill, smoker, griddle, burner, wood stove, outdoor heater, or any other outdoor cooking appliance that uses heat.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A smoker comprising:
    a smoke tube having first and second portions, at least the first portion movable with respect to the second portion;
    first and second openings respectively defined within the first and second portions, the first and second openings being aligned in a receiving position to collectively define a receiving opening that faces gravitationally upward to receive fuel, the first and second openings being offset in a heating position to enclose the fuel, and the first and second openings collectively defining a releasing opening in a releasing position to release contents of the smoke tube;
    a heating element associated with the smoke tube and selectively heating the smoke tube;
    a flow path communicating with the smoke tube and comprising:
        an inlet that receives forced air;
        a lower pathway communicably coupled to the inlet;
        a first acceleration pathway connecting to the lower pathway at a first end thereof, and a second acceleration pathway connecting to the lower pathway at a second end thereof, the first and second acceleration pathways each having an acceleration inlet where air enters the respective acceleration pathway, the first and second acceleration inlets each having a cross-sectional area that is larger than a cross-sectional area of acceleration outlets where air exits the acceleration pathways, the acceleration inlets located gravitationally lower than the acceleration outlets;
        first and second side pathways respectively connected to the first and second acceleration pathways; and
        an outlet manifold connected to the first and second side pathways at first and second ends of the outlet manifold, the outlet manifold having manifold openings for directing air vertically upward.

2. The smoker of claim 1, wherein the first and second portions are inner and outer tubes respectively including inner and outer gears that are manipulatable to adjust the first and second portions into the receiving, heating, or releasing positions.

3. The smoker of claim 2, further comprising inner and outer actuator rods respectively associated with the inner and outer gears and manipulatable to cause the inner and outer gears to rotate.

4. The smoker of claim 1, wherein the first and second portions each have a circular cross-section.

5. The smoker of claim 1, wherein the inlet is a blower input structured to receive and engage an output of a blower.

6. The smoker of claim 1, wherein the heater is a ceramic heater.

7. The smoker of claim 1, wherein the heater is located external to the smoke tube.

* * * * *